Figure 1:
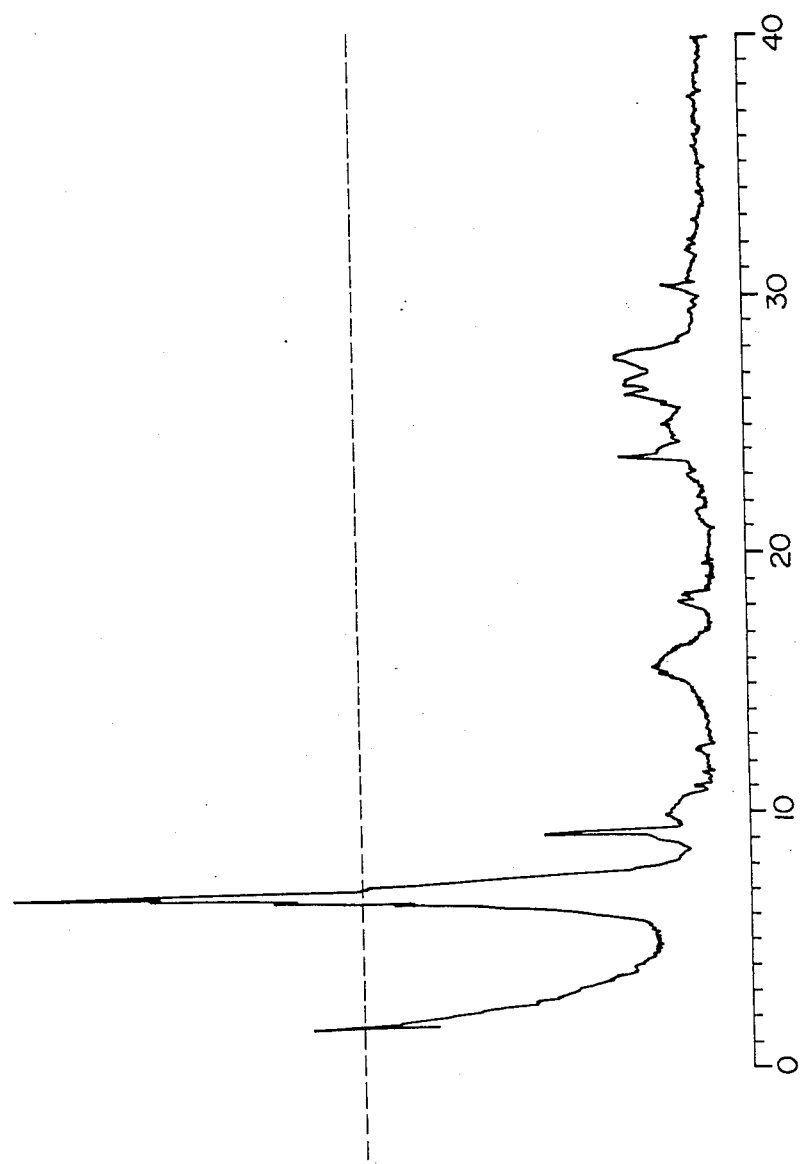

United States Patent [19]

Fujita et al.

[11] Patent Number: 4,785,091

[45] Date of Patent: Nov. 15, 1988

[54] PROCESS FOR PRODUCING COPPER PHTHALOCYANINE PIGMENT

[75] Inventors: Taira Fujita; Toshiaki Kishimoto; Hiroshi Okayasu, all of Osaka, Japan

[73] Assignee: Sumitomo Chemical Company, Limited, Osaka, Japan

[21] Appl. No.: 110,528

[22] Filed: Oct. 20, 1987

[30] Foreign Application Priority Data

| Oct. 31, 1986 | [JP] | Japan | 61-260991 |
|---|---|---|---|
| Jan. 30, 1987 | [JP] | Japan | 62-21224 |
| Feb. 24, 1987 | [JP] | Japan | 62-42221 |
| Apr. 1, 1987 | [JP] | Japan | 62-81949 |
| Jun. 8, 1987 | [JP] | Japan | 62-142964 |
| Jun. 23, 1987 | [JP] | Japan | 62-157328 |
| Jun. 25, 1987 | [JP] | Japan | 62-159175 |
| Jun. 30, 1987 | [JP] | Japan | 62-164805 |
| Jul. 1, 1987 | [JP] | Japan | 62-166030 |

[51] Int. Cl.$^4$ ............................................. C09B 47/06
[52] U.S. Cl. .................................. 540/144; 540/142; 540/143
[58] Field of Search .................. 540/142, 143, 144

[56] References Cited

U.S. PATENT DOCUMENTS

| 2,410,301 | 10/1946 | O'Neal | 540/144 |
|---|---|---|---|
| 2,861,005 | 11/1958 | Siegel | 540/144 X |
| 4,135,944 | 1/1979 | Wheeler | 106/288 Q |
| 4,171,309 | 10/1979 | Wheeler | 540/144 |

FOREIGN PATENT DOCUMENTS

| 1940781 | 5/1970 | Fed. Rep. of Germany . |
|---|---|---|
| 1964164 | 11/1970 | Fed. Rep. of Germany . |
| 66655 | 5/1973 | Japan . |
| 9097820 | 9/1974 | Japan . |
| 9131224 | 12/1974 | Japan . |
| 149358 | 9/1982 | Japan . |
| 141153 | 9/1982 | Japan . |
| 168950 | 10/1982 | Japan . |
| 195166 | 8/1986 | Japan . |
| 31175 | 9/1986 | Japan . |

Primary Examiner—Richard L. Raymond
Attorney, Agent, or Firm—Cushman, Darby & Cushman

[57] ABSTRACT

Copper phthalocyanine pigment which is a coloring material for ink or paint is prepared by allowing, for example, phthalate, urea, and cuprous chloride to react in a hydrophilic solvent in the presence of a catalyst and at least one element selected from the group consisting of aliphatic tetracarboxylic acids, benzophenone 3,3',4,4'-tetracarboxylic acid or anhydride thereof, pyromellitic acid or anhydride thereof, copper phthalocyanine sulfonic acids, copper phthalocyanine carbonyl imide, tetrahydrophthalic acid or derivative thereof, pyromellitic imide or derivative thereof, sulfophthalic acid, derivative thereof or the salt thereof and benzene carboxylic acid.

8 Claims, 4 Drawing Sheets

PROCESS FOR PRODUCING COPPER PHTHALOCYANINE PIGMENT

BACKGROUND OF THE INVENTION

1. Field of the Invention

The present invention relates to a process for producing a copper phthalocyanine pigment which is generally used as a blue colorant for use in inks, paints, plastics, etc. as an excellent blue pigment of clear hue and high tinting strength.

2. Description of the Prior Art

Copper phthalocyanine pigments have generally been produced by way of the first step of synthesizing crude copper phthalocyanine and the second step of pigmentation as below:

(1) Synthesis Step

A crude copper phthalocyanine is prepared by heating phthalic acid anhydride or the derivatives thereof, copper or copper compounds, a nitrogen source such as urea and a small amount of a catalyst in an inert high boiling solvent.

(2) Pigmentation Step

Since the copper phthalocyanine prepared by the synthesis step above is a lump of coarse particles, it has not clear hue and low tinting strength, and is not able to serve for practical use as it is. Accordingly, the pigmentation step is necessary to provide tinting strength, clearness and aptitude as a pigment. The step to this pigmentation includes a chemical method and a mechanical method of making finer; in the former, sulfate formed by adding sulfuric acid to the crude compound or dissolving the crude compound in highly concentrated sulfuric acid is poured in a large amount of water, and in the latter, mechanical grinding is applied to by a ball mill, a kneader, etc.

However, the above-mentioned process of synthesis of the crude copper phthalocyanine and then pigmentation involves the following drawbacks:

(1) the steps are lengthy and not economical;
(2) in the case of using sulfuric acid in the pigmentation step, there are serious problems such as corrosion of the apparatus and those of public pollutions e.g. a large amount of wasted acid;
(3) a large amount of energy is necessary for the mechanical grinding and the treatment is complicated and requires a great amount of energy for a long period of time; an amount per one batch is so small that productivity is extremely small; further after-treatment is needed for high COD wasted water.

In order to dissolve such various problems, development for the direct production process for a copper phthalocyanine pigment requiring no pigmentation step has been expected. Under such situation, the following various methods have been proposed: (1) Japanese Patent Laid-Open No. Sho 48-32919, (2) Japanese Patent Laid-Open Nos. Sho 49-131224 and 49-97820, (3) U.S. Pat. No. 4135944, (4) U.S. Pat. No. 4171309, (5) Japanese Patent Laid-Open Nos. Sho 57-141453 and 149358, (6) Japanese Patent Laid-Open No. Sho 57-168950, and (7) Japanese Patent Laid-Open Nos. Sho 61-195166 and 203175.

However, those methods are not quite satisfactory in operations and performances as pigment.

SUMMARY OF THE INVENTION

The present inventors have made extensive studies for eliminating the foregoing various drawbacks in the direct production process for copper phthalocyanine pigments and, as a result, have accomplished the present invention based on the findings that copper phthalocyanine fine particles are able to directly use as a pigment without further pigmentation step, when they are obtained by conducting the synthesis step above using a specific organic solvent and specific compound.

That is, the present invention provides a process for producing a copper phthalocyanine pigment, which comprises allowing a compound capable of forming phthalocyanine rings, urea, and copper or compounds thereof to react in a hydrophilic solvent in the presence of catalysts and at least one compound selected from the group consisting of the following (1)-(9):

(1) aliphatic tetracarboxylic acids,
(2) benzophenone-3,3',4,4'-tetracarboxylic acid or anhydride thereof,
(3) pyromellitic acid or anhydride thereof,
(4) copper phthalocyanine sulfonic acids,
(5) a compound represented by the formula (I):

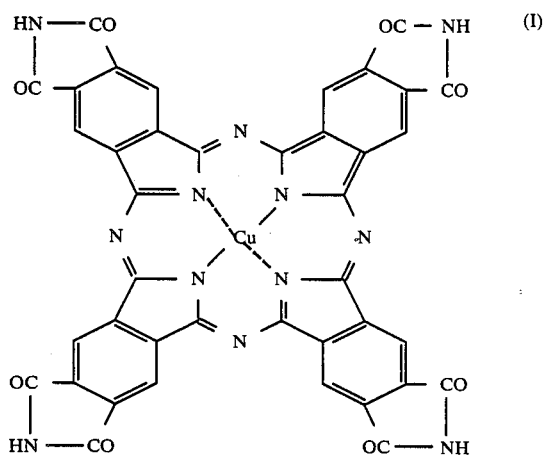

(6) a compound represented by the formula (II):

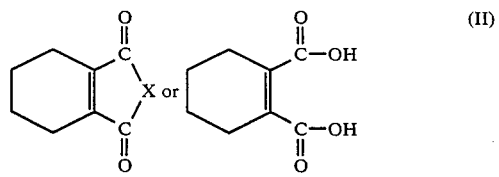

wherein X represents O, >NH, >NCH$_2$OH, >N—R in which R represents an alkyl group, allyl group or aralkyl group, or a group >NCH$_2$Y in which Y represents a phenyl group or derivatives thereof, a naphthalene ring or derivatives thereof, a phthalocyanine ring or derivatives thereof, (7) a compound represented by the formula (III):

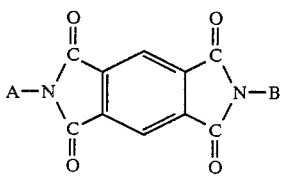

(III)

wherein A and B, which may be the same or different with each other, each represents a hydrogen atom, an alkyl group, hydroxyalkyl group, alkoxyalkyl group, cycloalkyl group, allyl group, aralkyl group or a group: —$CH_2Y$ in which Y represents a phenyl group or derivatives thereof, naphthalene ring or derivatives thereof or phthalocyanine ring or derivatives thereof, (8) a compound represented by the formula (IV):

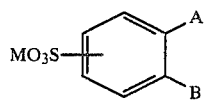

(IV)

wherein M represents a hydrogen or an alkali metal, A and B, which may be the same or different with each other, each represents a carboxyl group or a group derived from carboxyl group and, further, A and B may combine together to form an imide or acid anhydride and (9) a compound represented by the formula (V):

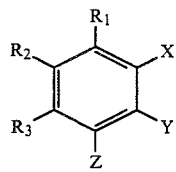

(V)

wherein $R_1$-$R_3$ each represents a hydrogen atom, a carboxyl group or a group derived from the carboxyl group or $R_1$-$R_2$ or $R_2$-$R_3$ may combine together to form an imide or acid anhydride ring; X, Y and Z, which may be the same or different with each other, each represents a carboxyl group, a group derived from the carboxyl group or nitrile group, further X—Y or Y—Z may combine together to form an imide or an acid anhydride.

Compounds capable of forming phthalocyanine rings usable in the present invention include, for example, phthalic acid salt, phthalic anhydride, phthalimide, phthalamic acid and salts or esters thereof, phthalic acid ester and phthalonitrile.

Copper or compounds thereof usable in the present invention include, for example, metallic copper, cuprous or cupric halide, copper oxide, copper cyanide, copper sulfate, copper nitrate, copper phosphate, copper acetate, copper sulfide and copper hydroxide. An amount of the copper compound, etc. used is about from 1 to 1.3 mol every 4 mol of the phthalic acid and/or derivatives thereof.

An amount of urea used in the present invention is about from 4 to 40 mol every 4 mol of the phthalic acid and/or derivatives thereof.

Catalysts usable in the present invention include, for example, molybdenum compounds such as ammonium molybdate, molybdenum oxide and phosphomolybdenic acid, titanium compounds such as titanium tetrachloride and titanic acid ester, zirconium compounds such as zirconium chloride and zirconium carbonate.

Hydrophilic organic solvents usable in the present invention include, for example, sulfolane, 2-methylsulfolane, 3-methylsulfolane, dimethylsulfoxide, 2,4-dimethylsulfolane, N-methylpyrrolidone, 1,3-dimethyl-2-imidazolidinone, etc.

In the present invention, the compounds (1)–(9) above are used in such an amount, preferably, from 1 to 30% by weight, and more preferably from 3 to 10% by weight based on the compound capable of forming the phthalocyanine ring such as phthalic acid.

The compounds (1)–(9) above may be added at any time before the formation of the phthalocyanine ring.

The temperature is usally within the range from 150° to 250° C.

The compounds (1)–(9) above are discussed in further detail.

Aliphatic tetracarboxylic acids (1) includes aliphatic tetracarboxylic acids and aliphatic tetracarboxylic dianhydrides. In concrete, those compounds represented by the following formulas (VI)–(VIII) are preferably used:

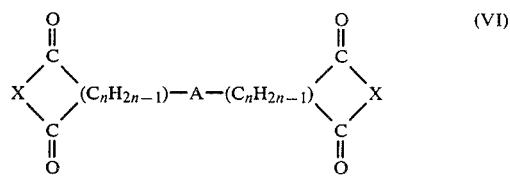

(VI)

wherein X represents >O or (—OH)×2; n represents a number of 2–4 and a connecting group A represents direct connecting or an aliphatic hydrocarbon or aromatic hydrocarbon residue.

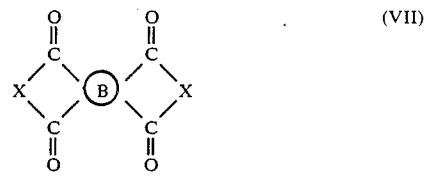

(VII)

wherein X represents >O or (—OH)×2; B represents an aliphatic cyclic residue having 4 to 8 carbon atoms.

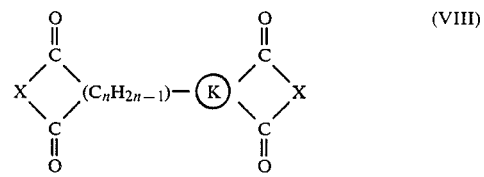

(VIII)

wherein X represents >O or (—OH)×2; n represents a number from 2 to 4, K represents a non-substituted, substituted or ring-condensed aliphatic cyclic residue having 4 to 10 carbon atoms.

As examples, the following compounds are mentioned:

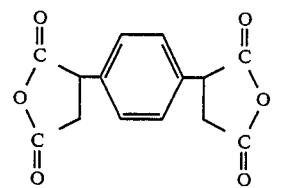
1
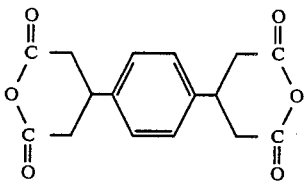
2
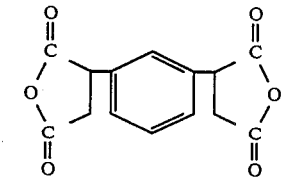
3
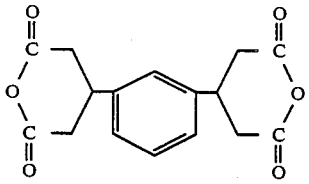
4
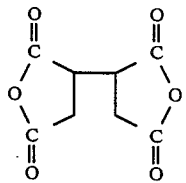
5
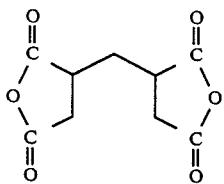
6
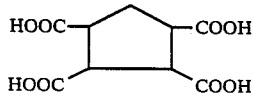
7
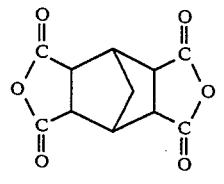
8
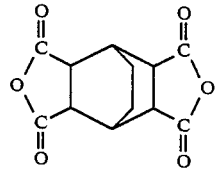
9
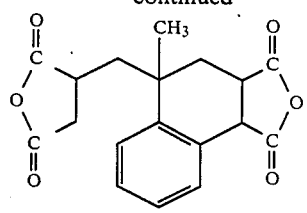
10
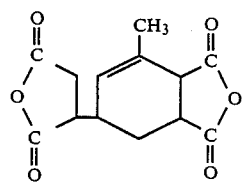
11
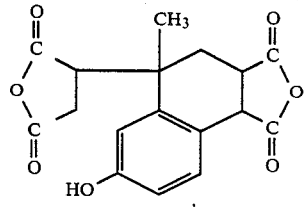
12
Copper phthalocyanine sulfonic acid (4) means a compound represented by the formula (IX):
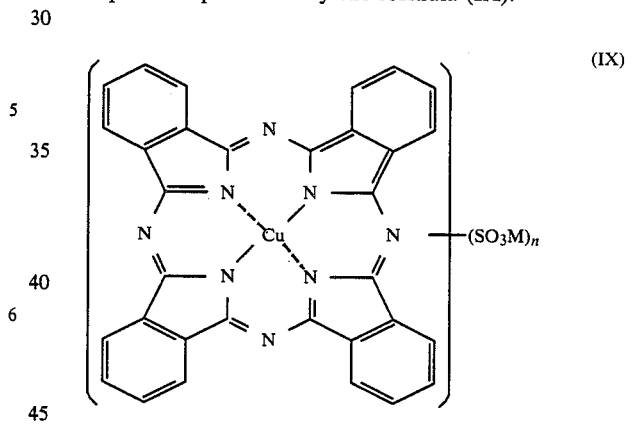
(IX)
wherein M represents a hydrogen atom or an alkali metal and n represents a number from 0.2 to 3.
As example, the following compounds are mentioned:
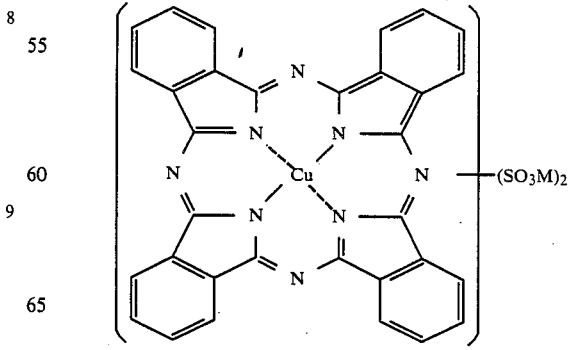
1
2

-continued
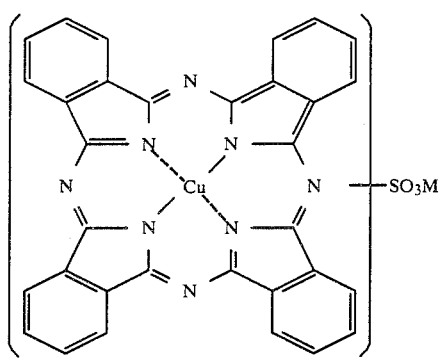—SO₃M
3
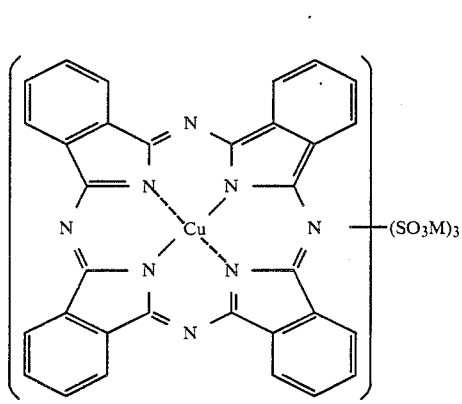—(SO₃M)₃
4 a mixture of:
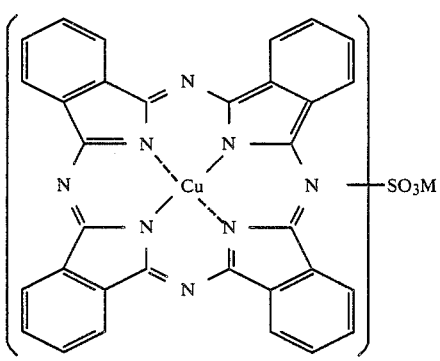—SO₃M
and
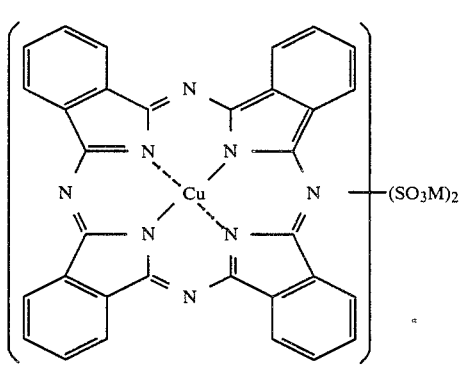—(SO₃M)₂
5 a Mixture of:
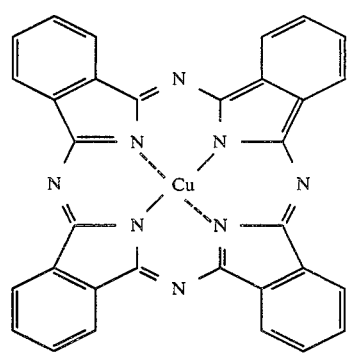
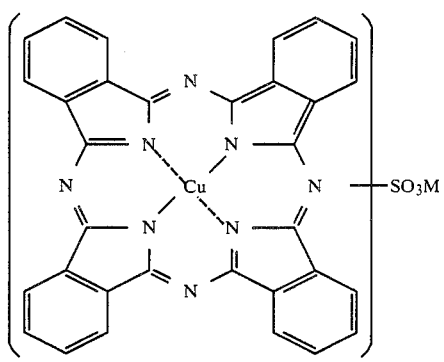—SO₃M
and
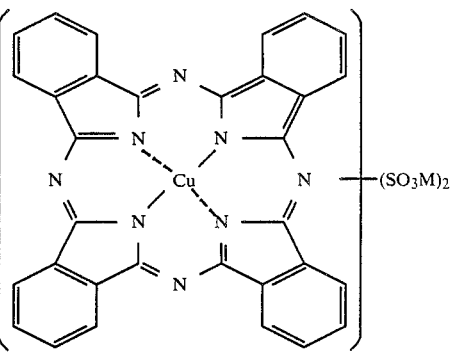—(SO₃M)₂
6 a mixture of:
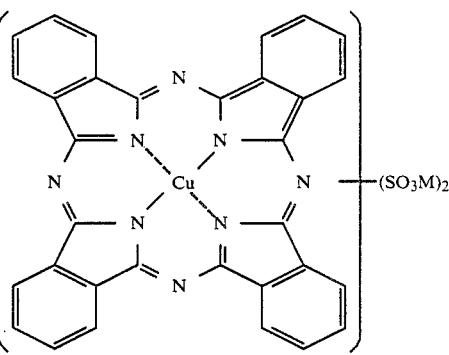—(SO₃M)₂
and -continued

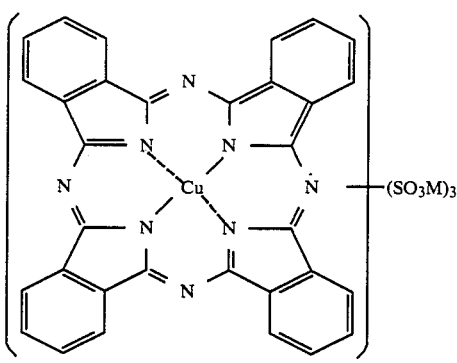

7 a mixture of:

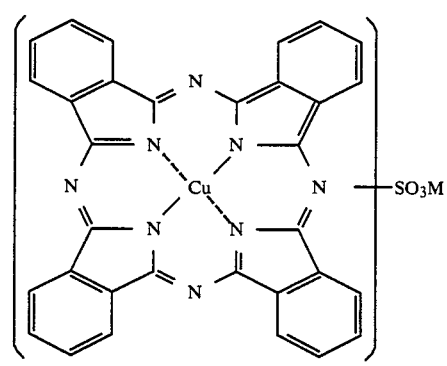

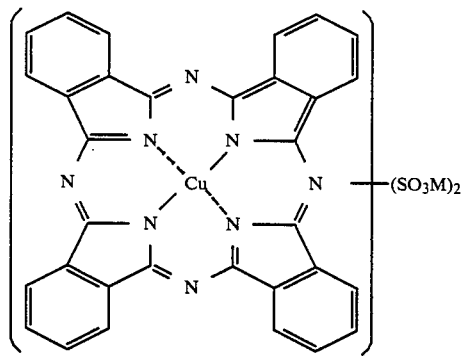

and

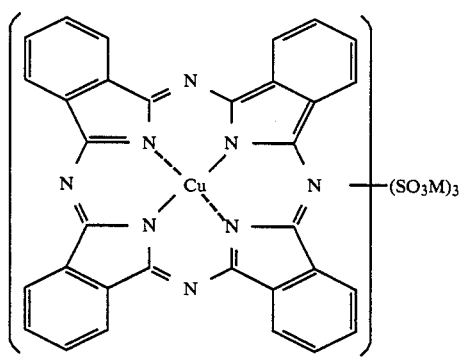

8 a mixture of:

-continued

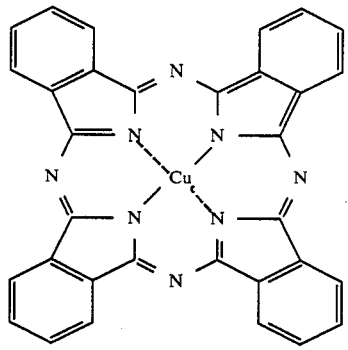

and

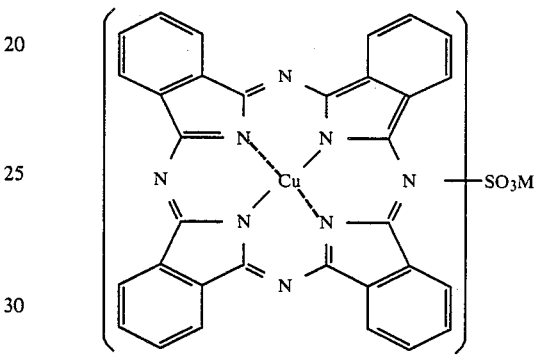

As described above, the compound represented by the formula (IX) above includes both individual compounds and mixtures thereof in which n represents a number of the total sulfonic acid groups based on the entire copper phthalocyanine nucleus in the individual compound or a mixture thereof.

The present inventors have further found that the compound represented by the formula (IX) in which n is 0.2–3, preferably 0.5–2, is particularly preferred not only for obtaining the pigment particles without any pigmentation but also for the synthesis of $\epsilon$-type copper phthalocyanine. That is, it is known that there are a number of crystal forms in copper phthalocyanine, and red-shade $\alpha$-type and green-shade $\beta$-type are usually used as pigments. Further, $\epsilon$-type which shows clearer hue in red-shade and excellent in the solvent stability than $\alpha$-type is so expensive that it was not widely used. The present process also provides a process for producing the $\epsilon$-type copper phthalocyanine having extremely disirable property and is of an industrial value without any pigmentation.

The compound of the formula (I) in (5) above is prepared easily by the following method.

That is, pyromellitic acid, pyromellitic anhydride or pyromellitic acid diimide is heated in an inert organic solvent with urea, copper or compound thereof, e.g., cuprous chloride, cupric chloride, copper sulfate, etc. in the presence of a catalyst, e.g., ammonia molybdate, titanium tetrachloride, antimonium oxide etc.

As an alternative method, tetracyano benzene is heated together with a metal salt and then treated with a strong alkali to obtain a phthalocyanine octacarboxylate and then ammonia, etc. is allowed to react to convert to the imide form. The method of synthesizing the compound (I) will be described later in the synthesis example.

The compound represented by the formula (II) in the (6) includes the following compounds:

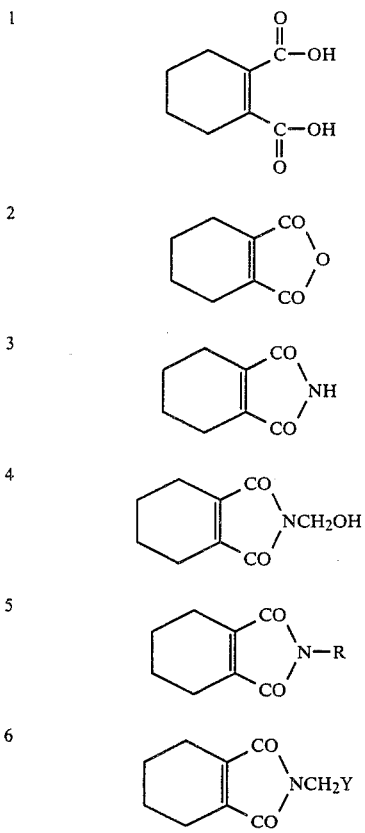

wherein R represents an alkyl group, allyl group or aralkyl group wherein Y represents a phenyl group or derivatives thereof or naphthalene ring or derivatives thereof, phthalocyanine ring or the derivative thereof.

As the specific examples, the following compounds are exemplified:

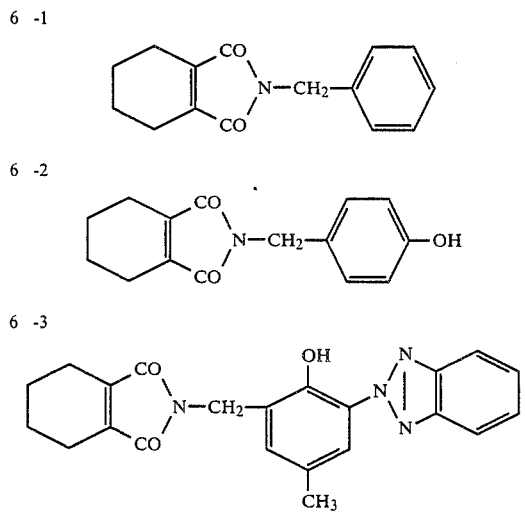

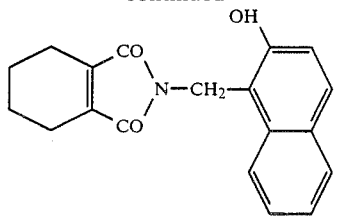

-continued

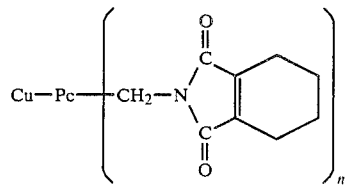

6 -5

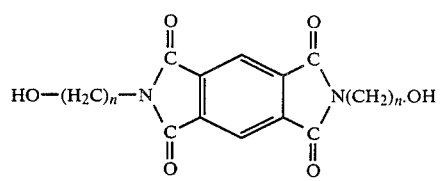

wherein Cu-Pc represents copper phthalocyanine ring and n=1-4.

Compounds represented by the formula (III) in (7) above include the followings:

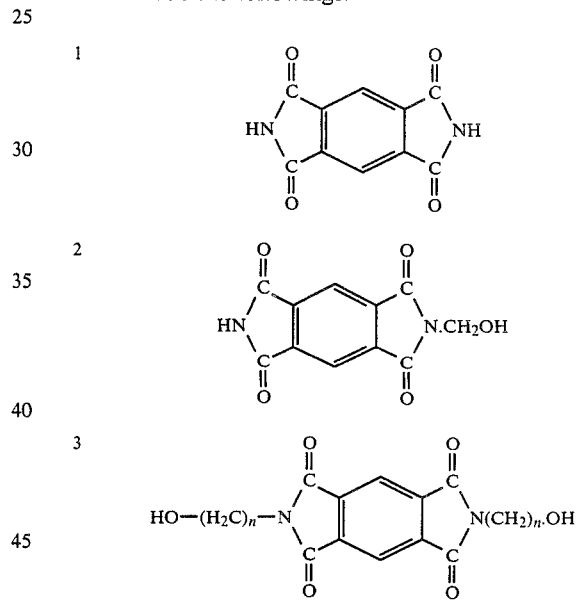

where n and n' represent an integer from 1 to 18.

4  A mixture of No. 1 and No. 2 compounds above

5

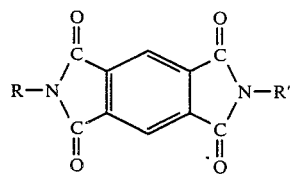

wherein R and R' each represents an alkyl group, aralkyl group or cycloalkyl group, etc.

Compounds represented by the formula (IV) in (8) include, for example, 4-sulfophthalic acid, 4-sulfophthalimide, 3-sulfophthalimide or alkali metal salts thereof, preferably 4-sulfophthalic acid.

Compounds represented by the formula (V) in (9) include, for example, benzene-1,2,3-tricarboxylic acid, benzene hexacarboxylic acid, benzene-1,2,3,4- or 1,2,3,5-tetracarboxylic acid.

According to the present invention, desired copper phthalocyanine pigment is obtained easily by substantially the same reaction procedures as those for producing usual crude copper phthalocyanine.

Copper phthalocyanine pigment obtained by the reaction is recovered by distilling off a solvent from a reaction mass under a reduced pressure, washing the product obtained with water or aqueous mineral acid solution and then filtering the same. Alternatively, the reaction mass is mixed with warm water, etc. followed by filtration.

It is surprising that a copper phthalocyanine usable as it is as a pigment is obtained only by way of the synthesis reaction step using phthalic acids, etc. without any pigmentation step as compared with the conventional process for producing copper phthalocyanine pigment.

When the thus prepared copper phthalocyanine pigment is dispersed into a medium depending on the purpose, such as resin, varnish, plastic, etc., paints, inks, plastic, colorants etc. are produced.

Copper phthalocyanine pigment thus obtained is particularly suitable as color matching pigment for black ink using carbon black. In particular, the present pigment has more desired hue and printability than any conventional Copper phthalocyanine pigments or an Alkali blue used for color matching. Any amount of the present copper phthalocyanine pigment may be used to this effect, as long as red-shade specific to carbon black disappears and the desired performances as black ink becomes to display. Color matching may be conducted by adding the present pigment as well as carbon black to a vehicle or varnish when they are being processed to form dispersion in mixers such as kneaders, three-rolls mills or beadsmills. Alternatively, the present pigment is added to a suitable vehicle or varnish to produce processing pigment or toner before it is added to black ink.

In the accompanying drawings, FIGS. 1-4 are X-ray diffraction spectrum of β-type copper phthalocaynine pigment in Example 6, IR-spectrum of structural formula (I) referred to in Example 14, X-ray diffraction spectrum of β-type copper phthalocyanine in Reference example 1 and X-ray diffraction spectrum of β-type copper phthalocyanine in Reference example 8, respectively.

EXAMPLES

The present invention will now be described referring to Examples, Comparative Examples, and Reference Examples.

In the examples "parts" and "%" are based on the weight and the specific surface area value is determined by $N_2$ gas adsorption of BET method.

Example 1

592 parts of phthalic anhydride, 960 parts of urea, 105 parts of cuprous chloride, 80 parts of titanium tetrachloride and 30 parts of tetracarboxylic acid represented by the following formula:

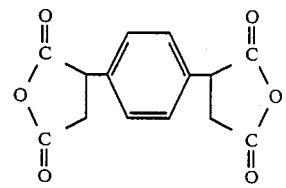

were added to 4,500 parts of sulfolane, the temperature was elevated to 180°-190° C. under stirring and the mixture was heated at that temperature for 5 hours. Then, the mixture was cooled to 100° C. and then 5000 parts of warm water (60° C.) was added. Then the reaction mass was filtered and, after the completion of the filtration, washed with 5,000 parts of warm water at 80° C. Then, recovered wet cake was added to 10,000 parts of 2% aqueous hydrochloric acid and then filtered after being stirred at 60° C. for one hour. Then, the cake was washed with 10,000 parts of warm water at 80° C. and dried to obtain 575 parts of the desired copper phthalocyanine. Specific surface area of the resultant compound was 70 m²/g.

Example 2

592 parts of phthalic anhydride, 960 parts of urea, 105 parts of cuprous chloride, 50 parts of titanium tetrachloride and 60 parts of tetracarboxylic acid represented by the following formula:

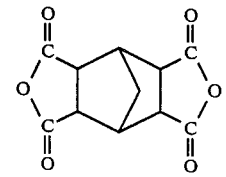

were added to 4,500 parts of sulfolane, the temperature was elevated to 180°-190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for on hour. Then, the cake was washed with 10,000 parts of warm water at 80° C. and dried to obtain 575 parts of the desired copper phthalocyanine. Specific surface area of the resultant compound was 75 m²/g.

Example 3

592 parts of phthalic anhydride, 960 parts of urea, 140 parts of cuprous chloride, 90 parts of titanium tetrachloride and 60 parts of tetracarboxylic acid represented by the following formula:

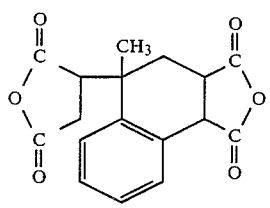

were added to 6,000 parts of sulfolane, the temperature was elevated to 170°–180° C. under stirring and the mixture was heated at that temperatures for 7 hours. Then, the mixture was cooled to 100° C. and then 5,000 parts of warm water of 60° C. was added. Then, the reaction mass was filtered and, after the completion of the filtraion, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 575 parts of the desired copper phthalocyanine. Specific surface area of the resultant compound was 75 m$^2$/g.

Example 4

592 parts of phthalic anhydride, 960 parts of urea, 150 parts of cuprous chloride, 10 parts of titanium tetrachloride and 30 parts of tetracarboxylic acid represented by the following formula:

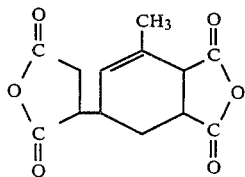

were added to 5,000 parts of N-methylpyrrolidone, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 550 parts of copper phthalocyanine. Specific surface area of the resultant compound was 70 m$^2$/g.

Example 5

592 parts of phthalic anhydride, 1,000 parts of urea, 100 parts of cuprous chloride, 6 parts of ammonium molybdate and 30 parts of tetracarboxylic acid represented by the following formula:

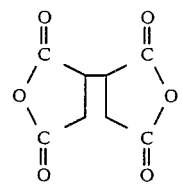

were added to 4,500 parts of sulfolane, the temperature was elevated to 180°–190° C. under stirring and the mixture was heated at that temperature for 5 hours. Then the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 565 parts of copper phthalocyanine. Specific surface area of the resultant compound was 70 m$^2$/g.

Example 6

592 parts of phthalic anhydride, 960 parts of urea, 105 parts of cuprous chloride, 80 parts of titanium tetrachloride and 30 parts of benzophenone-3,3',4,4'-tetracarboxylic acid were added to 5,000 parts of sulfolane, the temperature was elevated to 180°–190° C. under stirring and the mixture was heated at that temperature for 5 hours. Then, they were cooled to 100° C. and then 5,000 parts of warm water of 60° C. was added. Then, the reaction mass was filtered and, after the completion of the filtration, washed with 10,000 parts of warm water at 80° C. Then, recovered wet cake was added to 5,000 parts of 2% aqueous hydrochloric acid and filtered after being stirred at 60° C. for one hour. Then, the cake was washed with 10,000 parts of warm water at 80° C. and dried to obtain 575 parts of β-type copper phthalocyanine pigment having X-ray diffraction spectrum shown in FIG. 1. The specific surface area of the product was 120 m$^2$/g.

Example 7

592 parts of phthalic anhydride, 960 parts of urea, 105 parts of cuprous chloride, 80 parts of titanium tetrachloride and 50 parts of benzophenone-3,3',4,4'-tetracarboxylic acid dianhydride were added to 6,000 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water to 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 570 parts of β-type copper phthalocyanine. The specific surface area of the resultant compound was 115 m$^2$/g.

Example 8

592 parts of phthalic anhydride, 960 parts of urea, 105 parts of cuprous chloride, 80 parts of titanium tetrachloride and 30 parts of pyromellitic acid were added to 4,500 parts of sulfolane, the temperature was elevated to 180°-190° C. under stirring and the mixture was heated at that temperature for 5 hours. Then, the mixture was cooled to 100° C. and then 5,000 parts of warmed water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 575 parts of copper phthalocyanine. The purity of the resultant compound was 95% and the specific surface area thereof was 120 m$^2$/g.

Example 9

592 parts of phthalic anhydride, 960 parts of urea, 105 parts of cuprous chloride, 50 parts of titanium tetrachloride and 59 parts of pyromellitic acid were added to 4,500 parts of sulfolane, the temperature was elevated to 180°-190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 575 parts of copper phthalocyanine. The purity of the resultant compound was 96% and the specific surface area thereof was 105 m$^2$/g.

Example 10

592 parts of phthalic anhydride, 1,000 parts of urea, 108 parts of cuprous chloride, 90 parts of titanium tetrachloride and 20 parts of pyromellitic anhydride were added to 5,000 parts of sulfolane, the temperature was elevated to 180°-190° C. under stirring and the mixture was heated at that temperature for 7 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 600 parts of copper phthalocyanine. The purity of the resultant compound was 90% and the specific surface area thereof was 95 m$^2$/g.

Example 11

592 parts of phthalic anhydride, 800 parts of urea, 100 parts of cuprous chloride, 4 parts of ammonium molybdate and 40 parts of pyromellitic anhydride were added to 4,500 parts of sulfolane, the temperature was elevated to 180°-190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 8,000 parts of 2% aqueous hydrochloric acid and filtered after being stirred at 60° C. for one hour. Then, the cake was washed with 10,000 parts of warm water at 80° C. and dried to obtain 550 parts of the desired copper phthalocyanine. The purity of the resultant compound was 95% and the specific surface area thereof was 110 m$^2$/g.

Example 12

592 parts of phthalic anhydride, 960 parts of urea, 105 parts of cuprous chloride, 80 parts of titanium tetrachloride and 30 parts of copper phthalocyanine sulfonic acid (n=0.9 in the formula (IX)) were added to 4,500 parts of sulfolane, the temperature was elevated to 180°-190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 590 parts of the desired copper phthalocyanine pigment. Purity of the resultant compound was 95% and the specific surface area thereof was 65 m$^2$/g. Further, the crystal form was ε-type.

Example 13

592 parts of phthalic anhydride, 960 parts of urea, 105 parts of cuprous chloride, 50 parts of titanium tetrachloride and 30 parts of sodium copper phthalocyanine sulfonate (n=1.9 in the formula (IX)) were added to 4,500 parts of sulfolane, the temperature was elevated to 180°-190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 585 parts of copper phthalocyanine pigment. Purity of the resultant compound was 96% and the specific surface area thereof was 70 m$^2$/g. Further, the crystal form was ε-type.

Example 14

(Synthesis Example of the coexistent compound having the formula (I))

872 parts of pyromellitic anhydride, 960 parts of urea, 105 parts of cuprous chloride and 80 parts of titanium tetrachloride were added to 9,000 parts of sulfolane, the temperature was elevated to 190°-200° C. under stirring and the mixture was heated at that temperature for 10 hours. Then, the mixture was cooled to 100° C. and then, 5,000 parts of warm water of 60° C. was added. Then, the reaction mass was filtered and, after the completion of the filtration, washed with 10,000 parts of warm water at 80° C. Then, recovered wet cake was added to 15,000 parts of 2% aqueous hydrochloric acid and filtered after being stirred at 60° C. for 2 hours. Then, the cake was washed with 1,500 parts of warm water at 80° C. Then, the wet cake was taken out and added to 10,000 parts of aqueous 10% ammonia solution and stirred at 30°-35° C. for one hour. Then, the cake was filtered and washed with 10,000 parts of water at 30° C. Further, the wet cake was taken out, added to 5,000 parts of DMF at 50° C., stirred for 2 hours and then filtered. Similar DMF processing was conducted further twice. Then, the cake was washed with methanol, washed with water and then dried to obtain 650 parts of blue green crystals. The melting point of the compound was higher than 300° C.

Elemental analysis found: C=56.0%, H=1.8%, N=19.9% and Cu=7.3%.

These values well agree to those calculated which are given below, assuming the structural formula (I):

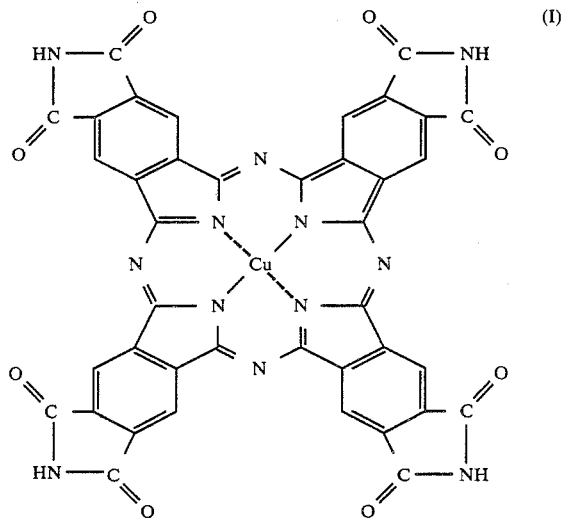

C=56.4%
H=1.9%
N=19.7%
Cu=7.5%

Figure 2:
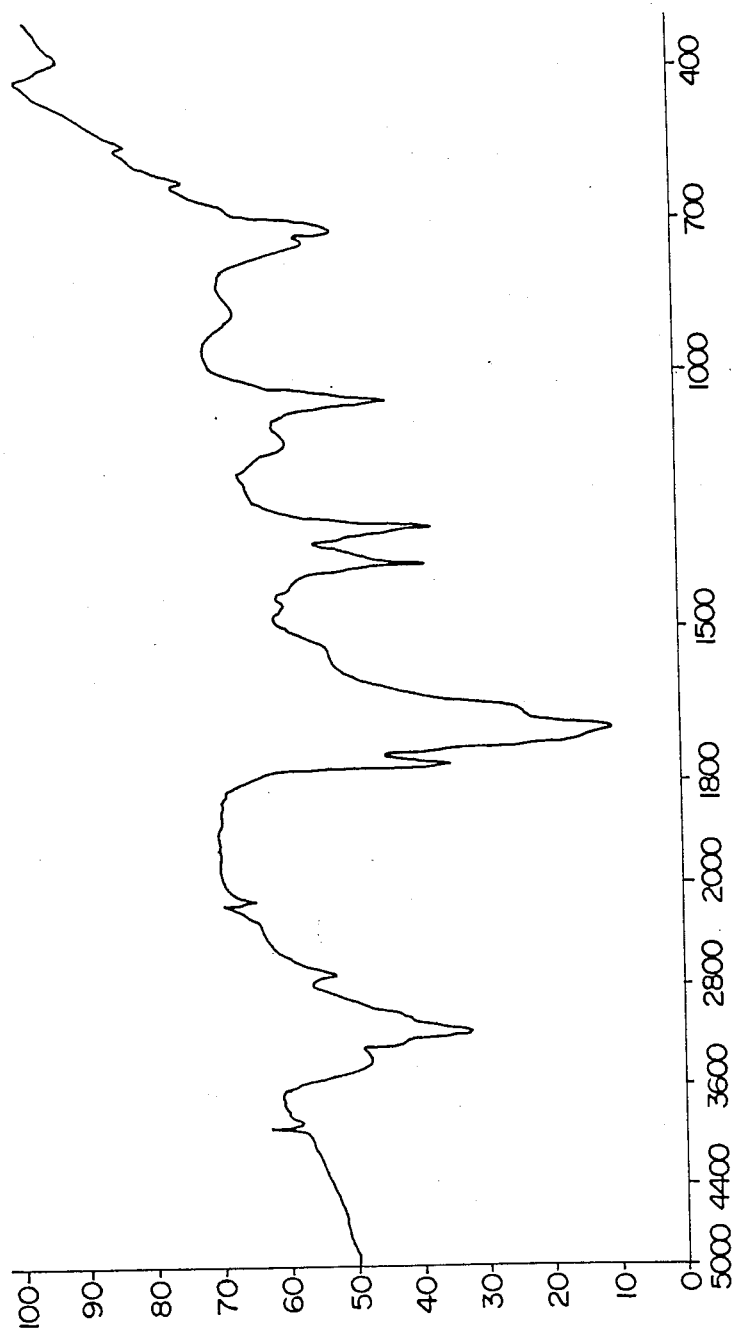

Further, the above-mentioned structural formula was confirmed by IR shown in FIG. 2.

(Synthesis of copper phthalocyanine pigment)

592 parts of phthalic anhydride, 960 parts of urea, 105 parts of cuprous chloride, 80 parts of titanium tetrachloride and 30 parts of copper phthalocyanine derivative (I) obtained in the foregoing Synthesis Example were added to 6,000 parts of sulfolane, the temperature was elevated to 180°–190° C. under stirring and the mixture was heated at that temperature for 5 hours. Then, the mixture was cooled to 100° C. and then 5,000 parts of warmed water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 580 parts of copper phthalocyanine. The specific surface area of the resultant compound was 90 m²/g.

Example 15

592 parts of phthalic anhydride, 960 parts of urea, 140 parts of cuprous bromide, 20 parts of titanium tetrachloride and 30 parts of copper phthalocyanine derivative (I) obtained in the foregoing Synthesis Example were added to 6,000 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° c. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 576 parts of copper phthalocyanine. The specific surface area of the resultant compound was 80 m²/g.

Example 16

592 parts of phthalic anhydride, 960 parts of urea, 105 parts of cuprous chloride, 6 parts of ammonium molybdate and 45 parts of copper phthalocyanine derivative (I) obtained in the foregoing Synthesis Example were added to 6,000 parts of sulfolane, the temperature was elevated to 180°–190° C. under stirring and the mixture was heated at that temperature for 5 hours. Then, they were cooled to 100° C. and then, 5,000 parts of warm water of 60° C. was added. Then, the reaction mass was filtered and, after the completion of the filtration, washed with 5,000 parts of warm water at 80° C. Then, recovered wet cake was added to 10,000 pats of 2% aqueous hydrochloric acid and filtered after being stirred at 60° C. for one hour. Then, the cake was washed with 10,000 parts of warm water at 80° C. and dried to obtain 578 parts of copper phthalocyanine. The specific surface area of the resultant compound was 80 m²/g.

Example 17

592 parts of phthalic anhydride, 960 parts of urea, 105 parts of cuprous chloride, 80 parts of titanium tetrachloride and 30 parts of 3,4,5,6-tetrahydrophthalimide were added to 4,500 parts of sulfolane, the temperature was elevated to 180°–190° C. under stirring and the mixture was heated at that temperature for 5 hours. Then the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 575 parts of the desired copper phthalocyanine. Purity of the resultant compound was 95% and the specific surface area thereof was $70^2$ m/g.

Example 18

592 parts of phthalic anhydride, 960 parts of urea, 105 parts of cuprous chloride, 50 parts of titanium tetrachloride and 35 parts of 3,4,5,6-tetrahydrophthalic anhydride were added to 4,500 parts of sulfolane, temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 575 parts of copper phthalocyanine.

Purity of the resultant compound was 96% and the specific surface area thereof was 73 m²/g.

Example 19

592 parts of phthalic anhydride, 1,000 parts of urea, 108 parts of cuprous chloride, 90 parts of titanium tetrachloride and 40 parts of N-hydroxymethyl-3,4,5,6-tetrahydrophthalimide were added to 5000 parts of sulfolane, the temperature was elevated to 180°–190° C. under stirring and the mixture was heated at that temperature for 5 hours. Then, the mixture was cooled to 100° C. and then, 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 600 parts of copper phthalocyanine. Purity of the resultant compound was 90% and the specific surface area thereof was 85 m²/g.

Example 20

592 parts of phthalic anhydride, 960 parts of urea, 105 parts of cuprous chloride, 80 parts of titanium tetrachloride and 35 parts of benzotriazole derivative of the following structure:

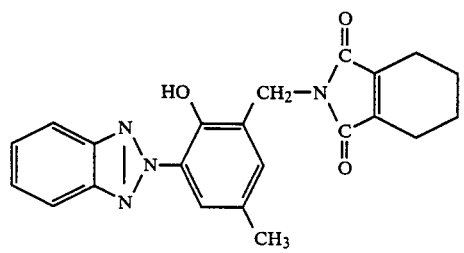

were added to 6,000 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 590 parts of copper phthalocyanine. Purity of the resultant compound was 92% and the specific surface area thereof was 70 m²/g.

Example 21

592 parts of phthalic anhydride, 960 parts of urea, 105 parts of cuprous chloride, 80 parts of titanium tetrachloride and 40 parts of a mixture of phthalocyanine derivatives of the following structure:

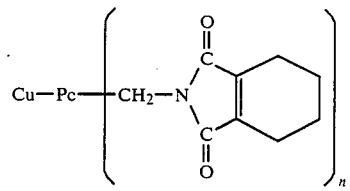

wherein n=1–4 and Cu-Pc represents copper phthalocyanine ring, were added to 5,500 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 8,500 parts of 2% aqueous hydrochloric acid and filtered after being stirred at 60° C. for one hour. Then, the cake was washed with 10,000 parts of warm water at 80° C. and dried to obtain 600 parts of copper phthalocyanine. Purity of the resultant compound was 95% and the specific surface area thereof was 80 m²/g.

Example 22

592 parts of phthalic anhydride, 800 parts of urea, 100 parts of cuprous chloride, 4 parts of ammonium molybdate and 30 parts of 3,4,5,6-tetrahydrophthalimide were added to 4,500 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 8,000 parts of 2% aqueous hydrochloric acid and filtered after being stirred at 60° C. for one hour. Then, the cake was washed with 10,000 parts of warm water at 80° C. and dried to obtain 550 parts of copper phthalocyanine. Purity of the resultant compound was 95% and the specific surrface area thereof was 70 m²/g.

Example 23

592 parts of phthalic anhydride, 720 parts of urea, 200 parts of cuprous iodide, 40 parts of titanium tetrachloride and 12 parts of 3,4,5,6-tetrahydophthalimide were added to 4,500 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake and added to 10,000 parts of 2% aqueous hydrochloric acid and filtered after being stirred at 60° C. for one hour. Then the cake was washed with 10,000 parts of warm water at 80° C. and dried to obtain 530 parts of copper phthalocyanine. Purity of the resultant compound was 95% and the specific surface area thereof was 73 m²/g.

Example 24

592 parts of phthalic anhydride, 960 parts of urea, 105 parts of cuprous chloride, 50 parts of titanium tetrachloride and 30 parts of an imide represented by the following formula:

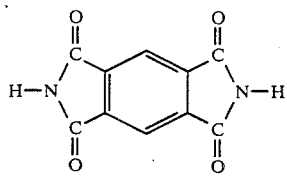

were added to 4,500 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 5,000 parts of 2% aqueous hydrochloric acid and filtered after being stirred at 60° C. for one hour. Then, the cake was washed with 5,000 parts of warm water at 80° C. and dried to obtain 575 parts of copper phthalocyanine. The specific surface area of the resultant compound was 90 $m^2/g$.

Example 25

592 parts of phthalic anhydride, 960 parts of urea, 105 parts of cuprous chloride, 80 parts of titanium tetrachloride and 45 parts of imide methylol represented by the following formula:

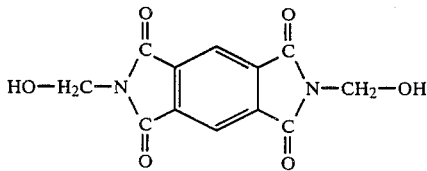

were added to 6,000 parts of sulfolane, the temperature was elevated to 180°–190° C. under stirring and the mixture was heated at that temperature for 5 hours. Then, the mixture was cooled to 100° C. and 5,000 parts of warm water of 60° C. was added. Then, The reaction mass was filtered and, after the completion of the filtration, washed with 5,000 parts of warm water at 80° C. Then, recovered wet cake was added to 5,000 parts of 2% aqueous hydrochloric acid and filtered after being stirred at 60° C. for one hour. Then, the cake was washed with 5,000 parts of warm water at 80° C. and dried to obtain 590 parts of copper phthalocyanine. The specific surface area of the resultant compound was 90 $m^2/g$.

Example 26

592 parts of phthalic anhydride, 800 parts of urea, 100 parts of cuprous chloride, 4 parts of ammonium molybdate and 40 parts of imide represented by the following formula:

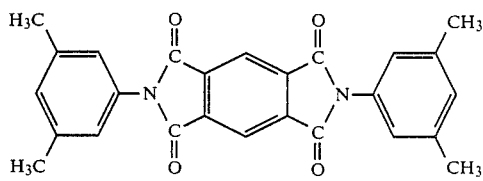

were added to 4,500 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 8,000 parts of 2% aqueous hydrochloric acid and filtered after being stirred at 60° C. for one hour. Then, the cake was washed with 10,000 parts of warm water at 80° C. and dried to obtain 550 parts of copper phthalocyanine. The specific surface area of the resultant compound was 85 $m^2/g$.

Example 27

592 parts of phthalic anhydride, 960 parts of urea, 105 parts of cuprous chloride, 80 parts of titanium tetrachloride and 30 parts of 4-sulfophthalic acid were added to 6,000 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 578 parts of copper phthalocyanine. The specific surface area of the resultant compound was 102 $m^2/g$.

Example 28

592 parts of phthalic anhydride, 960 parts of urea, 105 parts of cuprous chloride, 80 parts of titanium tetrachloride and 30 parts of 4-sulfophthalimide were added to 6,000 parts of sulfolane, the temperature was elevated at 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, it was washed with 10,000 pats of warm water at 80° C. and dried to obtain 573 parts of copper phthalocyanine. The specific surface area of the resultant compound was 100 $m^2/g$.

Example 29

592 parts of phthalic anhydride, 960 parts of urea, 105 parts of cuprous chloride, 50 parts of titanium tetrachloride and 30 parts of 4-sulfophthalic acid were added to 6,000 parts of dimethylsulfoxide, the temperature was elevated to 170°–180° C. under stirring and the mixture was heated at that temperature for 5 hours. Then, the mixture was cooled to 100° C. and then 5,000 parts of warm water of 70° C. was added. Then, the reaction mass was filtered and, after the completion of the filtration, washed with 5,000 parts of warm water at 80° C. Then, recovered wet cake was added to 10,000 parts of 5% aqueous hydrochloric acid and filtered after being stirred at 60° C. for one hour. Then, the cake was washed with 10,000 parts of warm water at 80° C. and dried to obtain 540 parts of copper phthalocyanine. The specific surface area of the resultant compound was 80 $m^2/g$.

Example 30

592 parts of phthalic anhydride, 1,000 parts of urea, 100 parts of cuprous chloride, 50 parts of titanium tetrachloride and 60 parts of 4-sulfophthalimide were added to 6,000 parts of sulfolane, the temperature was elevated to 210°–220° C. under stirring and the mixture was heated at that temperature for 3 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, it was washed with 10,000 parts of warm water at 80° C. and dried to obtain 598 parts of copper phthalocyanine. The specific surface area of the resultant compound was 90 $m^2/g$.

Example 31

592 parts of phthalic anhydride, 1,000 parts of urea, 100 parts of cuprous chloride, 6 parts of ammonium molybdate and 30 parts of trisodium 4-sulfophthalate were added to 4,500 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C.and dried to obtain 565 parts of copper phthalocyanine. The specific surface area of the resultant compound was 98 $m^2/g$.

Example 32

592 parts of phthalic anhydride, 960 parts of urea, 150 parts of cuprous chloride, 80 parts of titanium tetrachloride and 30 parts of hemimellitic acid (benzene-1,2,3-tricarboxylic acid) were added to 4,500 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, it was washed with 10,000 parts of warm water at 80° C. and dried to obtain 575 parts of copper phthalocyanine. The specific surface area of the product was 75 $m^2/g$.

Example 33

592 parts of phthalic anhydride, 960 parts of urea, 150 parts of cuprous chloride, 80 parts of titanium tetrachloride and 40 parts of mellitic acid (benzene-hexacarboxylic acid) were added to 4,500 parts of sulfolane, the temperature was elevated to 180°–190° C. under stirring and the mixture was heated at that temperature for 5 hours. Then, the mixture was cooled to 100° C. and then 5,000 parts of warm water of 60° C. was added. Then, the reaction mass was filtered and, after the completion of the filtration, washed with 5,000 parts of warm water at 80° C. Then, recovered wet cake was added to 10,000 parts of 2% aqueous hydrochloric acid and filtered after being stirred at 60° C. for one hour. Then, the cake was washed with 10,000 parts of warm water at 80° C. and dried to obtain 570 parts of copper phthalocyanine. The specific surface area of the product was 73 $m^2/g$.

Reference example 1

Figure 3:
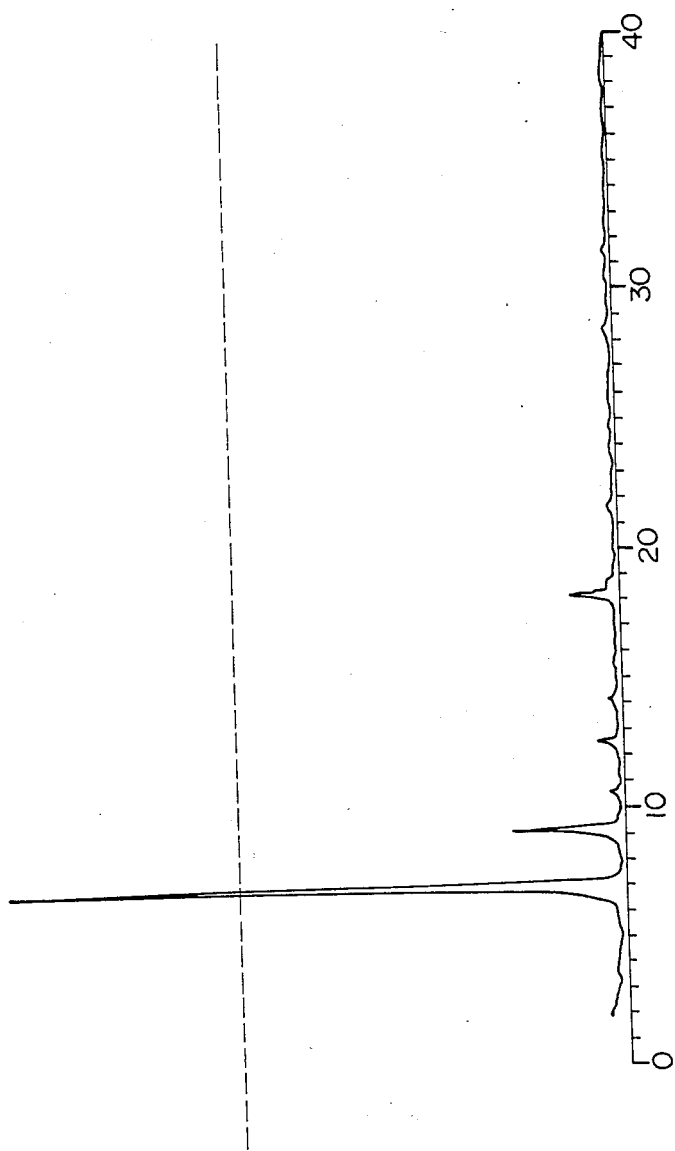

The same reaction as Example 1 was conducted except that no tetracarboxylic acid derivative was present, until 560 parts of β-type copper phthalocyanine having the X-ray diffraction spectrum shown in FIG. 3 was obtained. Purity was 95% and the specific surface area was 25 $m^2/g$.

Reference example 2

Examples 3 was repeated except 4,500 parts of nitrobenzene were used in place of 4,500 parts of sulfolane. Color of the reaction mass was not blue but brown. Then, nitrobenzene was removed under a reduced pressure, the residue was added to 5,000 parts of warm water at 60° C. The mixture was stirred at that temperature, filtered and dried. The resultant compound weighed 300 parts. The compound was brown colored and no formation of copper phthalocyanine was confirmed by FD-Mass spectral measurement.

Reference examples 3–7

592 parts of phthalic anhydride, 960 parts of urea, 105 parts of cuprous chloride were heated to 190°–200° C. under strring while varying the catalyst, the solvent and the coexistent compounds, and heated at that temperature for 8 hours. Color of the reaction masses was not blue but brown.

| No. | Catalyst | Solvent | | Coexistent compounds |
|---|---|---|---|---|
| 3 | Ammonium molybdate 10 parts | Hisol P (tert-alkyl benzene) | 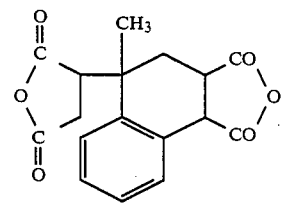 | 50 parts |

-continued

| No. | Catalyst | Solvent | | Coexistent compounds |
|---|---|---|---|---|
| 4 | Titanium tetra-chloride 80 parts | Trichloro-benzene | 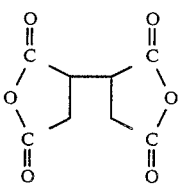 | 50 parts |
| 5 | Ammonium molybdate 10 parts | Hisol P | 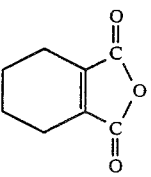 | 30 parts |
| 6 | Ammonium molybdate 10 parts | o-dichloro-benzene | 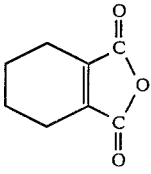 | 30 parts |
| 7 | Ammonium molybdate 30 parts | Tetralin | 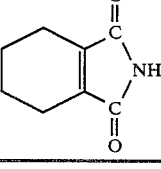 | 30 parts |

Reference example 8

Figure 4:
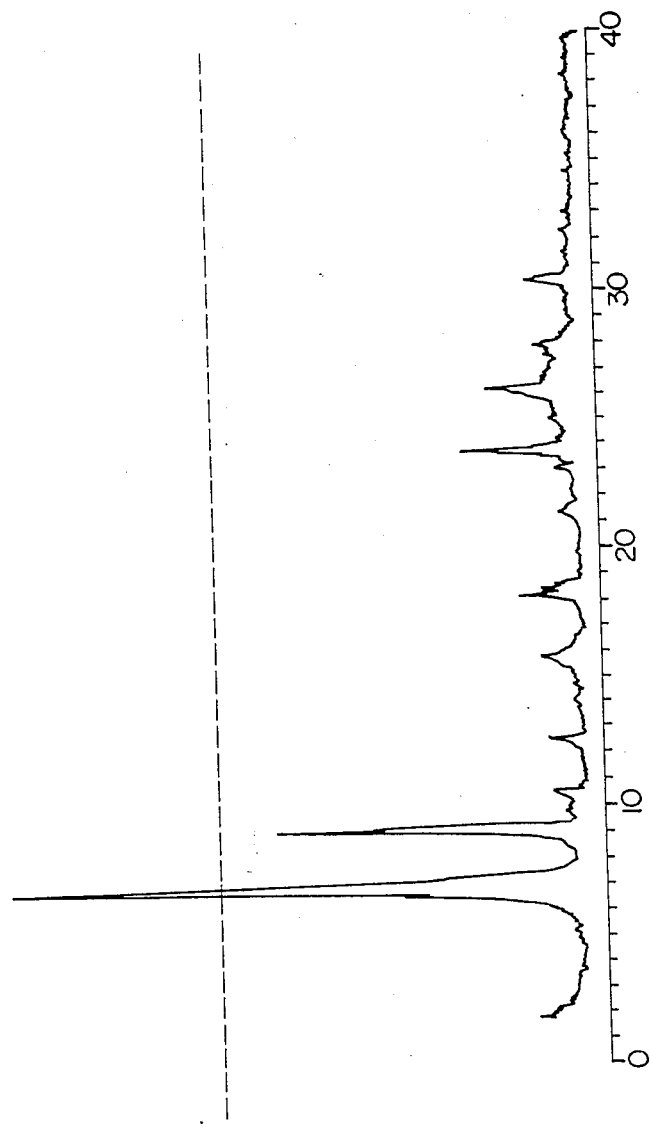

Heating under stirring at 180°–190° C. for 5 hours as in Example 7 was conducted except that 3,500 parts of Hisol P (manufactured by Nippon Petroleum Co.) and 10 parts of ammonium molybdate were used in place of 6,000 parts of sulfolane and 80 parts of titanium tetrachloride, respectively. Then, Histol P was removed under a reduced pressure, the residue was added to 10,000 parts of aqueous 2% hydrochloric acid, stirred at 60° C. for one hour, filtered, washed and then dried to obtain 570 parts of β-type copper phthalocyanine having X-ray diffraction spectrum as shown in FIG. 4. The specific surface area of the resultant compound was 35 m²/g.

Reference example 9

592 parts of phthalic anhydride, 960 parts of urea, 105 part of cuprous chloride, 30 parts of pyromellitic acid and 10 parts of ammonium molybdate were added to 5,000 parts of nitrobenzene, the temperature was elevated to 190°–200° C. under stirring and the mixture was heated at that temperature for 5 hours. After the reaction was over, the solvent was removed under a reduced pressure, the residue was added to 10,000 parts of aqueous 2% hydrochloric acid, stirred at 60° C. for one hour, filtered, then washed with 10,000 parts of warm water at 80° C. and dried to obtain 570 parts of copper phthalocyanine. The resultant compound had specific surface area of 30 m²/g.

Reference example 10

The same procedure as in Example 12 was conducted except that 40 parts of a compound represented by the following formula:

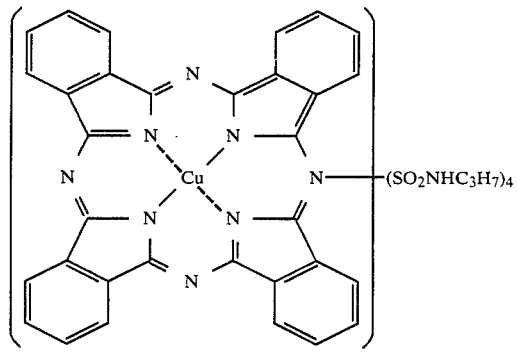

was used in place of copper phthalocyanine sulfonic acid, to obtain 570 parts of copper phthalocyanine. Purity was 80% and the specific surface area was 30 m²/g. The crystal from was β-type.

Reference example 11

The same procedure as in Example 32 was conducted except that 30 parts of trimellitic acid (benzene-1,2,4-tricarboxylic acid) was used in place of humimellitic acid, to obtain 576 parts of copper phthalocyanine. The resultant compound had specific surface area of 35 $m^2/g$.

Comparative example 1

100 parts of commercially available crude copper phthalocyanine, 400 parts of sodium chloride and 100 parts of ethylene glycol were ground for 5 hours by twine-arm kneader while maintaining at a temperature from 80° to 85° C. The mixture was washed with warm water at 80° C. and the then dried to obtain 98 parts of copper phthalocyanine pigment. The purity was 96% and the specific surface area was $70^2$ m/g.

Inks were prepared by using 4 parts of various copper phthalocyanine pigments, 80 parts of titanium white and 160 parts of linseed oil. Tinting strength was measured and listed in the table below.

Standard (100): tinting strength of ink where pigment obtained in comparative example 1 was used.

| Example | Tinting strength |
|---|---|
| Comparative Example 1 | 100% |
| Reference Example 1 | 20% |
| Reference Example 9 | 30% |
| Reference Example 11 | 40% |
| Example 1 | 100% |
| Example 3 | 105% |
| Example 5 | 100% |
| Example 6 | 120% |
| Example 7 | 120% |
| Example 9 | 120% |
| Example 10 | 110% |
| Example 11 | 120% |
| Example 12 | 105% |
| Example 15 | 105% |
| Example 16 | 105% |
| Example 17 | 101% |
| Example 19 | 98% |
| Example 21 | 103% |
| Example 24 | 110% |
| Example 25 | 110% |
| Example 26 | 105% |
| Example 27 | 130% |
| Example 28 | 130% |
| Example 30 | 120% |
| Example 32 | 101% |
| Example 33 | 100% |

Comparative example 2

4 parts of copper phthalocyanine pigment obtained in Comparative Example 1 was placed in a plastic bottle charged with 90 parts of glass beads (3 mm diameter each), to which 12 parts of melamine alkyd paint varnish and 14 parts of xylene were added. After being processed in a paint shaker for one hour, the mixture was further processed for 10 minutes with additional 50 parts of the same melamine alkyd varnish. Then, the glass beads were filtered using a metal gauge to obtain a blue primary color paint. 3 part of the blue primary color paint and 5 parts of the same kind of white paint containing 30% titanium white were well mixed by a glass rod to prepare a blue paint.

Then, copper phthalocyanines obtained in Examples and Reference Examples were similarly prepared into paints. Tinting strengths thereof were listed in the table below.

| Example | Tinting strength |
|---|---|
| Comparative Example 1 | 100% |
| Reference Example 1 | 30% |
| Example 2 | 110% |
| Example 7 | 125% |
| Example 9 | 120% |
| Example 13 | 110% |
| Example 14 | 120% |
| Example 18 | 110% |
| Example 24 | 110% |
| Example 27 | 135% |
| Example 33 | 105% |

We claim:

1. A process for producing copper phthalocyanine pigment, which comprises:

conducting the reaction of (a) phthalic anhydride or derivatives thereof, (b) urea and (c) copper or compounds thereof in a hydrophilic solvent in the presence of catalysts and at least one compound selected from the group consisting of:

(1) aliphatic tetracarboxylic acids or an anhydride thereof, (2) benzophenone-3,3',4,4'-tetracarboxylic acid or an anydride thereof, (3) pyromellitic acid or an anhydride thereof, (4) copper phthalocyanine sulfonic acid, (5) a compound represented by the formula (I):

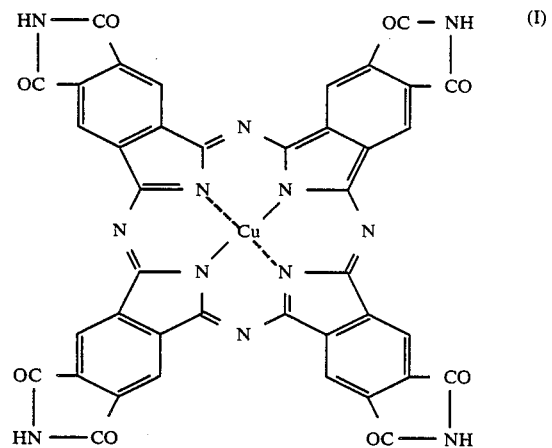

(6) a compound represented by the formula (II):

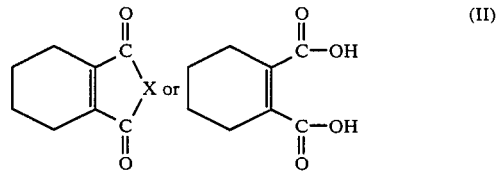

wherein X represents O, >NH, >NCH$_2$OH, >N—R in which R represents an alkyl group, allyl group or aralkyl group or a group NCH$_2$ Y in which Y represents a phenyl group or derivatives thereof, a naphthalene ring or derivatives thereof or a phthalocyanine ring or derivatives thereof, (7) a compound represented by the formula (III):

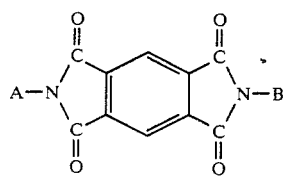

wherein A and B, which may be the same or different with each other, each represents a hydrogen atom, an alkyl group, hydroxyalkyl group, alkoxyalkyl group, cycloalkyl group, allyl group, aralkyl group or a group —$CH_2Y$ in which Y represents a phenyl group or derivatives thereof, a naphthalene ring or a derivatives thereof or a phthalocyanine ring or derivatives thereof, (8) a compound represented by the formula (IV):

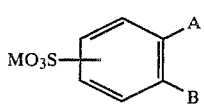

wherein M represents a hydrogen or an alkali metal, A and B, which may be same or different with each other, each represents a carboxyl group or a group derived from a carboxyl group and further, A and B may combine together to form an imide or an acid anhydride, and (9) a compound represented by the formula (V):

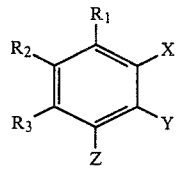

wherein $R_1$–$R_3$ each represents a hydrogen atom, a carboxyl group or a group derived from a carboxyl group and, $R_1$–$R_2$ or $R_2$–$R_3$ may combine together to form an imide or an acid anhydride ring, X, Y and Z, which may be the same or different from each other wherein each represents a carboxyl group, a group derived from the carboxyl group or a nitrile group, and further X-Y or Y-Z may combine together to form an imide or an acid anhydride.

2. A process as claimed in claim 1, wherein the aliphatic tetracarboxylic acids are compounds represented by the following formula (VI):

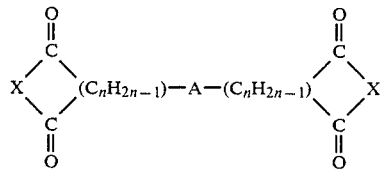

wherein X represents >O or (—OH)×2, n represents a number from 2 to 4 and a connecting group A represents a direct connecting or an aliphatic hydrocarbon or aromatic hydrocarbon residue.

3. A process as claimed in claim 1, wherein the aliphatic tetracarboxylic acids are compounds represented by the following formula (VII):

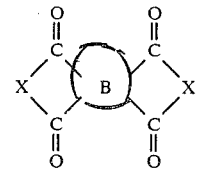

wherein X represents >O or (—OH)×2, and B represents an aliphatic cyclic residue having from 4 to 10 carbon atoms.

4. A process as claimed in claim 1, wherein the aliphatic tetracarboxylic acids are compounds represented by the following formula (VIII):

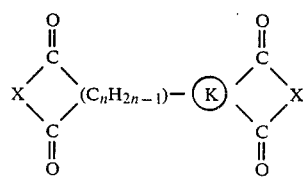

wherein X represents >O or (—OH)×2, n represents a number from 2 to 4 and K represents a non-substituted, substituted or ring-condensed cycloaliphatic residue having 4 to 10 carbon atoms.

5. A process as claimed in claim 1, wherein the copper phthalocyanine sulfonic acids are a compound represented by the following formula (IX):

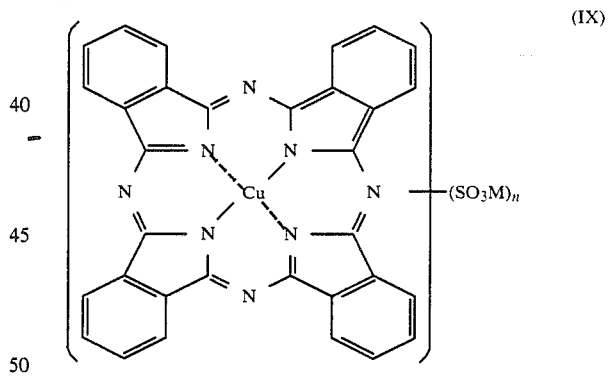

wherein M represents a hydrogen atom or an alkali metal atom and n represents a number from 0.2 to 3.

6. A process as claimed in any one of claims 1 to 5, wherein the reaction temperature is from 150° to 250° C.

7. A process as claimed in any one of claims 1 to 6, wherein an amount of at least one of the compounds (1)–(9) defined in claim 1 is from 1 to 30% by weight based on the compound capable of forming the phthalocyanine ring.

8. A process for producing fine copper phthalocyanine particles comprising:
conducting the reaction of (a) phthalic acid or a derivative thereof, (b) copper or compounds thereof, and (c) urea in a hydrophilic solvent in the presence of catalysts and 3 to 10% by weight of an aliphatic tetracarboxylic acid or an anhydride thereof, wherein the aliphatic tetracarboxylic acid is (a) represented by the following formula (VI):

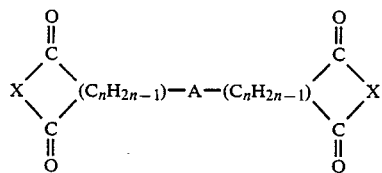 (VI)

wherein X represents —O— or (—OH)×2, n represents a number from 2 to 4 and a connecting group A represents a direct connecting or an aliphatic hydrocarbon or aromatic hydrocarbon residue;

(b) represented by the following formula (VII):

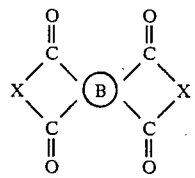 (VII)

wherein X represents —O— or (—OH)×2, and b represents an aliphaticycl rendue having from 4 th 10 carbon atoms; or (c) represented by the following formula (VIII):

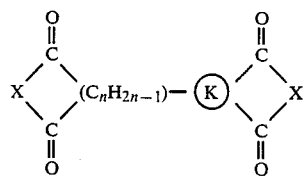 (VIII)

wherein X represents —O— or (—OH)×2, n represents a number from 2 to 4 and K represents a non-substituted, substituted or ring-condensed cycloalphatic residue having 4 to 10 carbon atoms, whereby the average surface area of the thus obtained copper phthalocyanine particles is greater than about 70 m$^2$/gram.

* * * * *